United States Patent [19]

Feher

[11] Patent Number: 4,816,828

[45] Date of Patent: Mar. 28, 1989

[54] AIRCRAFT DAMAGE ASSESSMENT AND SURVEILLANCE SYSTEM

[76] Inventor: Kornel J. Feher, 6314 Friars Rd., San Diego, Calif. 92108

[21] Appl. No.: 845,932

[22] Filed: Mar. 27, 1986

[51] Int. Cl.⁴ ............................................. H04N 7/18
[52] U.S. Cl. .................... 340/945; 73/178 R; 244/1 R; 358/93; 358/103; 360/5
[58] Field of Search ............... 340/945, 521, 539, 540; 244/1 R, 158 R, 161, 117 R; 358/103, 104, 108, 109, 87, 93, 106, 248; 364/424, 578; 73/178 R; 434/40, 30; 360/5, 13, 31; 369/47, 21; 342/55, 66; 353/12, 13

[56] References Cited

U.S. PATENT DOCUMENTS

| | | | |
|---|---|---|---|
| 2,959,779 | 11/1960 | Miller et al. | 342/55 |
| 3,053,932 | 9/1962 | Worst | 342/55 |
| 3,165,573 | 1/1965 | Moultrié | 244/1 R |
| 3,461,429 | 8/1969 | Gray | 360/5 |
| 3,484,549 | 12/1969 | Ricketts et al. | 358/103 |
| 3,557,304 | 1/1971 | Rue et al. | 358/103 |
| 3,711,638 | 1/1973 | Davies | 244/1 R |
| 3,721,499 | 3/1973 | Narbaits-Jaureguy | 358/103 |
| 3,885,090 | 5/1975 | Rosenbaum | 358/105 |
| 3,999,007 | 12/1976 | Crane | 358/103 |
| 4,112,818 | 9/1978 | Garehime, Jr. | 358/108 |
| 4,310,851 | 1/1982 | Pierrat | 358/109 |
| 4,349,837 | 9/1982 | Hinds | 358/93 |
| 4,495,520 | 1/1985 | Kravitz et al. | 358/174 |
| 4,568,972 | 2/1986 | Arents | 358/108 |

OTHER PUBLICATIONS

Freedman, Larry A., "Space Shuttle Closed Circuit Television System", *IEEE 1981, National Aerospace and Electronics Conference,* May 1981, pp. 23-30.

Carrier and Pope, "Overview of the Space Shuttle Orbiter Communication and Tracking System", *IEEE,* vol. COM-26, No. 11, Nov. 1978, pp. 1494–1506.

*Primary Examiner*—Donnie L. Crosland
*Assistant Examiner*—Brent A. Swartout
*Attorney, Agent, or Firm*—Brown, Martin, Haller & McClain

[57] ABSTRACT

An in flight damage assessment and surveillance system for aircraft using imaging apparatus for capturing optical images of predetermined portions of the aircraft disposed along the exterior of said aircraft in a manner such that the flight characteristics of the aircraft remain substantially unaltered. The images captured are recorded on a storage media mounted within the aircraft and having an enclosure which provides for the survival of the storage media even when subjected to the harsh environment of an aircraft crash. A display for displaying the captured optical images to aircraft crew members is also positioned within the aircraft along with apparatus for interfacing the imaging apparatus to recording apparatus and the display. The system can also include second imaging apparatus for capturing optical images of selected portions of the interior of the aircraft as well as a telemetry device for transmitting images to or from ground based stations.

11 Claims, 2 Drawing Sheets

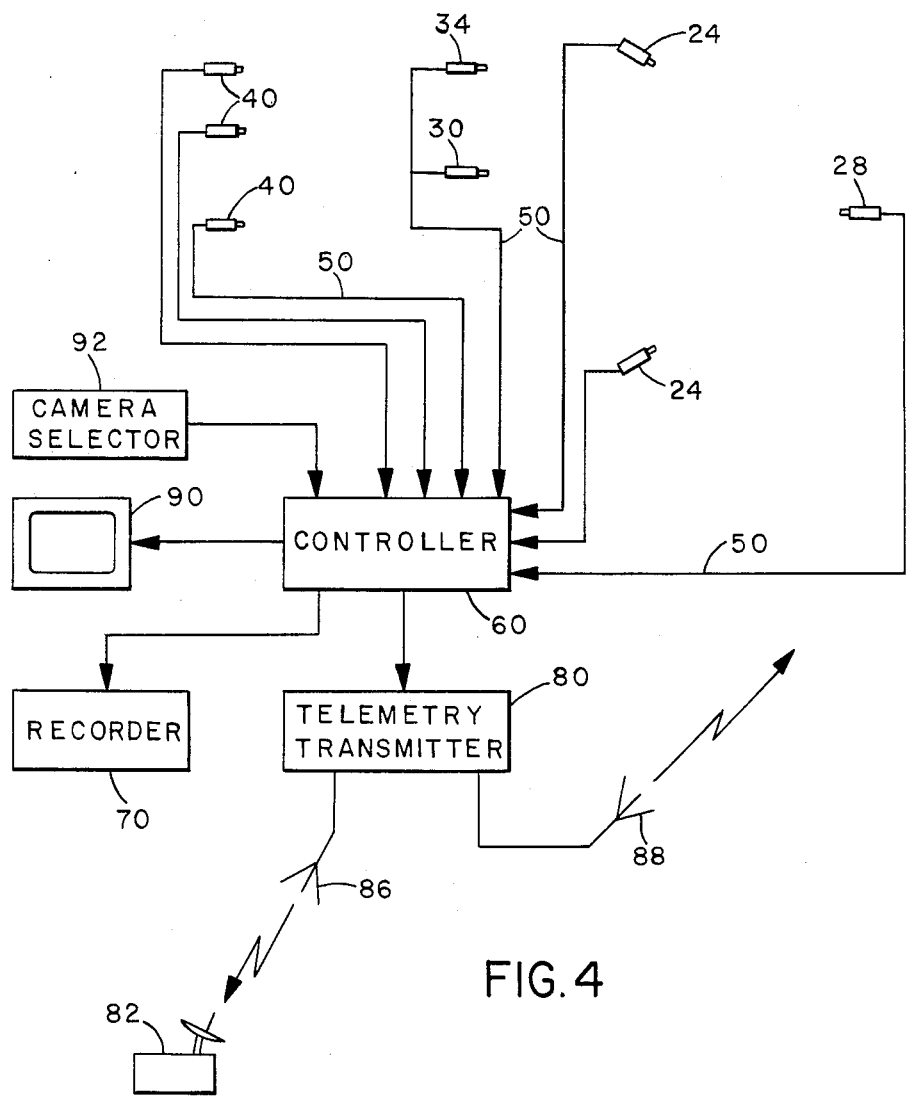

AIRCRAFT DAMAGE ASSESSMENT AND SURVEILLANCE SYSTEM

BACKGROUND OF THE INVENTION

1. Field of the Invention

This invention relates to aircraft safety and more particularly to a system for optically monitoring an aircraft and recording the resulting images on a crash-survivable recording system. The invention further relates to a method of capturing images of the exterior or interior of an aircraft and displaying them to crew members or transferring them to ground stations while in flight or on the ground.

2. Background

The airline or air carrier industry transports a fairly large volume of travelers to many destinations every day. One of the primary concerns of airline passengers, as well as various governmental agencies charged with transportation safety, is the safety of aircraft which are provided by a multitude of carriers and aircraft manufacturers. Over time, the general public, and most airline passengers, have developed a positive feeling for airline safety. Statistically speaking, air travel has been safer than other presumably safe activities. As an example, in 1963 there were 18 times as many people involved in gun related accidents, 67 times as many in fires, and 360 times as many in automobile accidents as were involved in aircraft related accidents. In 1964, only 1 in 405,000 air travelers were involved in an accident. However, during the 1984 through 1985 time period, this perception of safety was challenged by an unusually large increase in the number of accidents or air disasters, as well as the notoriety with which they were reported.

Government agencies such as the National Transportation Safety Board and the Federal Aviation Agency investigate the events of every airline accident and attempt to ferret out the root cause to allay public fears that the accident will repeat itself on another flight. Accident investigations attempt to pinpoint whether factors such as design error, pilot error, improper maintenance, or nature were the cause. In this manner, specific recommendations can be made to correct a persistent or latent problem. However, it has become increasingly difficult to ascertain the true cause of many crashes.

The principle tool in aircraft accident investigations are flight recorders which are commonly known as "black boxes". There are two "boxes" on every commercial aircraft, one containing a recorder for instrument data and the other for voice, with each being engineered to withstand the rigors of a catastrophic aircraft crash. These recorders provide information such as air speed, altitude, heading, vertical acceleration etc., which tells something about the aircraft's condition and conversations of the crew or those in the "flight deck" area which indicates what the crew "thought" was happening.

In using the data provided by the black box recorders, several facts have become apparent. First, the data is actually more limited than desired for a complete analysis. Instrumentation data, which may be false in complex system failures, may indicate symptoms but not causes. As an example, indication of hydraulic line failure and loss of control is typically the result of other structural damage and not the cause. Internal instrumentation only monitors internal control systems to indicate what external structural or control elements "should" be doing but not what they actually are doing.

Second, even if a particular structural failure is known to occur, it can often be the symptom of several alternative damage scenerios. Using current investigation techniques there is no way of knowing what was actually occurring on the exterior surfaces of the aircraft to better determine the sequence of events.

Third, it appears that the difference between successful and unsuccessful reactions by a crew to certain damage profiles is more a matter of chance than certainty. The crew must quickly "guess" at the cause of a problem, or the physical state of affairs on the outer structure of an aircraft and hope that they are right. Evidence in some airline crashes suggests that pilots may have had time to counteract a given problem if they only knew the true nature of the damage. It is critical for a pilot to know the full extent of damage since many types of damage, say to hydraulic lines or elevator sections may exhibit the same control response at first. Certain systems such as flap extensions also have a lag between control exercise and response leading to over compensation in emergencies. The crew responses may not be directed in many situations to the correct problem. If the pilot chooses the wrong maneuver or power correction, the problems are greatly increased.

Pilots using traditional instrumentation and ordinary flight experience simply cannot know the true extent of external damage. There is currently no external monitoring system for aircraft to inform the pilot of the nature of damage which he is trying to counteract. The only technique available is for a crew member to walk though the aircraft for visual inspection or, if weather allows, fly by an airport observation point and receive confirmation from the ground as to the damage. Besides being a costly (fuel) procedure, this approach pre-supposes that there is time for such observation. Generally no such opportunity exists.

A factor of increasing importance in complicating air carrier safety is an ever increasing threat of human intervention in the form of sabotage, hijacking, or terrorism. Even if an aircraft is properly designed, manufactured, maintained, and operated, these forms of human activity make air transportation a dangerous or risky form of travel for many each year.

In the case of sabotage, it is extremely difficult to provide adequate security monitoring of an aircraft in large busy terminal areas using conventional techniques. During refueling, loading, cleaning and maintenance many people may approach a given aircraft. It is simply not practical to use the traditional "guards" to monitor all personnel during this time for large numbers of aircraft. In addition, previously "cleared" personnel are often influenced by others to change.

In the case of terrorism, no adequate system exists for monitoring the presence of known or prospective terrorist group members. Additionally, there is no system for monitoring the events of a terrorist or other type of hijacking while an aircraft is flight. This leads to a total dependence upon information provided over the radio from personnel that are either under threat of death or are themselves perpetrators. The lack of any or even some accurate information prevents most government agencies or police forces from adequately responding to a hijacking.

In order to increase the general safety of air travel and counter terrorist or sabotage activities, what is needed is a new system to: provide pilots with in flight visual damage assessment information; record external and internal optical image data in a crash survivable form; and provide security monitoring information for the interior or exterior. The system must be associated with each aircraft individually but also capable of providing information to centralized monitoring points for further viewing or analysis.

SUMMARY

Accordingly, it is a principal purpose of the present invention to provide aircraft crew members with real time in flight damage assessment of the exterior surfaces of the aircraft.

Another purpose of the present invention is to provide for the crash-survivable recording of optical observations of the exterior or interior of the aircraft.

A further purpose of the present invention is to provide for improved security monitoring of an aircraft, including during passenger boarding, and ground maintenance Yet another purpose of the present invention is to provide a system for providing in flight damage assessment or security information to ground stations for data base update or analysis.

These purposes and other objects and advantages, are realized in an in flight damage assessment system for aircraft having imaging means, such as video cameras, for capturing optical images of predetermined portions of said aircraft disposed along the exterior of said aircraft such that the flight characteristics of the aircraft remain substantially unaltered. A means for recording the images captured by said imaging means on a storage media is provided, said recording means having an enclosure which provides for the survival of said storage media even when subjected to the harsh environment of an aircraft crash. A display means for displaying said captured optical images to aircraft crew members is also provided with means for interfacing said imaging means to said recording means and said display means. Additionally, a telemetry transfer means transfers captured optical images to remote receiving stations or receives images therefrom.

BRIEF DESCRIPTION OF THE DRAWINGS

The above and other objects and advantages of the present invention will become apparent from the following description when read in conjunction with the drawings wherein:

FIG. 3 is an interior plan view of the aircraft of FIG. 1; and

FIG. 4 is a schematic view of the damage assessment and surveillance system of the present invention.

DETAILED DESCRIPTION OF THE PREFERRED EMBODIMENT

The present invention represents a method and system for providing in flight visual damage assessment of the exterior of an aircraft as well as interior security monitoring or surveillance. These functions are achieved by using a series of optical image scanning devices connected to a crash-survivable recorder apparatus as well as a crew display station. In addition, the system can employ special image selection means for providing multiple views for crew members and a telemetry link to ground based monitoring or transmitting stations either directly or via satellite.

Figure 1:
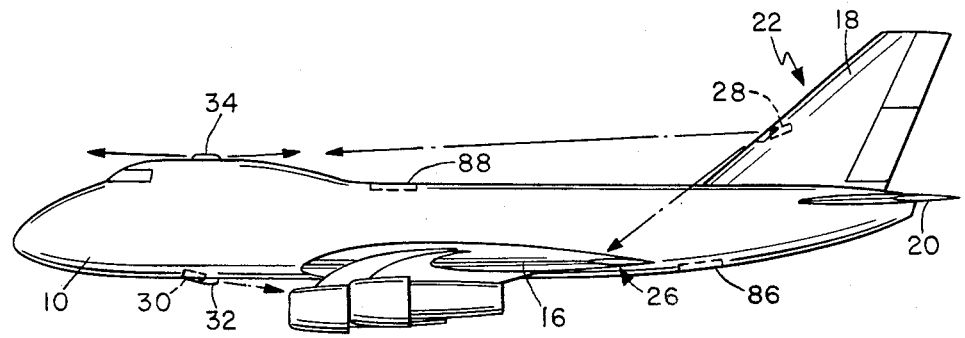
FIG. 1 is a side view of an aircraft employing a damage assessment and surveillance system according to the present invention.
Figure 2:
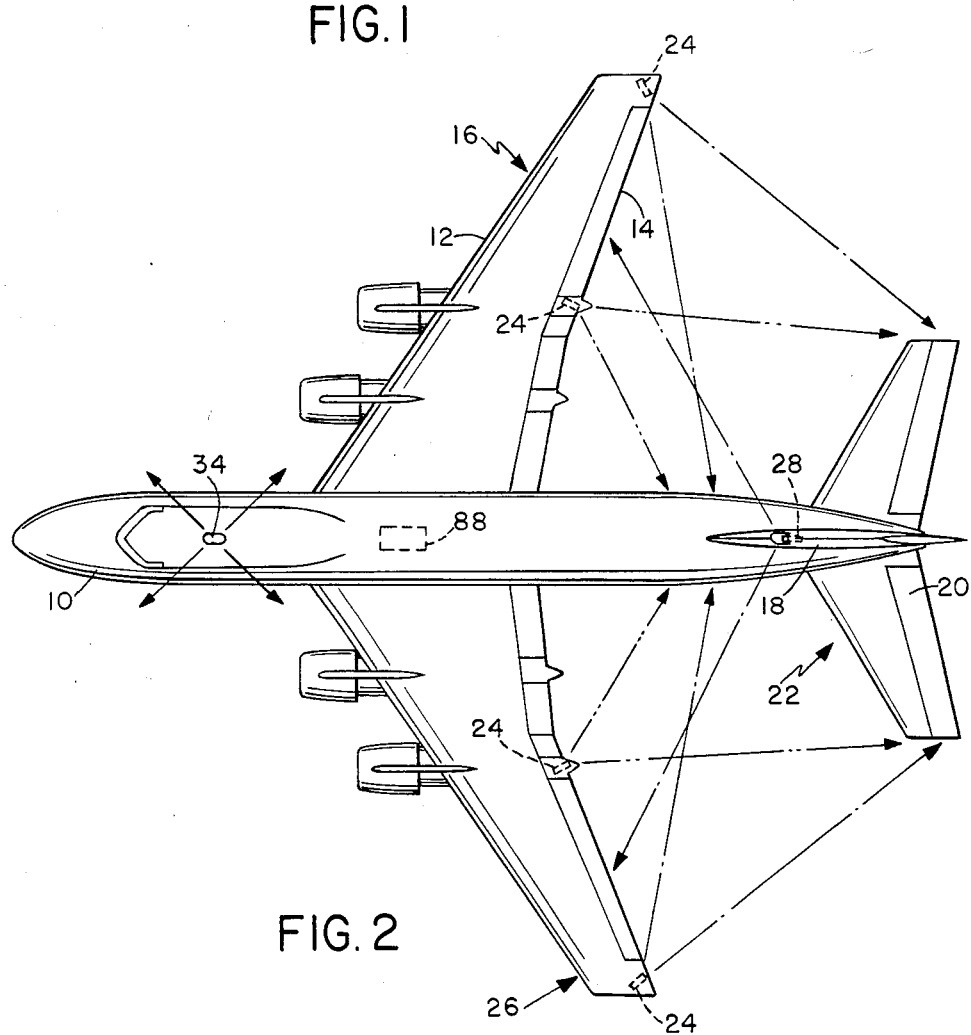
FIG. 2 is a top view of the aircraft of FIG. 1.

The basic principles of a damage assessment system constructed according to the present invention are illustrated in FIGS. 1 and 2 where, in application, aircraft 10 has components of a damage assessment system distributed thereon. A series of optical imaging devices such as, but not limited to, high resolution cameras are employed to collect images or image data from predetermined fields of view (FOV).

Generally in any aircraft there are certain critical components and surface areas or structures that are most important in determining the flight stability of the aircraft. That is, certain key aircraft surface zones are most susceptible to damage and are foremost important to the pilot when faced with a damage assessment problem.

The first of these areas are the leading 12 and trailing 14 edges of wings 16 with their associated flaps and air brake structures. Another key area is the rear vertical 18 and horizontal stabilizer 20 areas commonly referred to as the aft or tail section 22 of the aircraft. A final area of relative importance is the fuselage but mostly in the wing intersection or lower under carriage area. This area contains many of the control lines and systems, as well as the cargo doors, and landing gear structures. Damage to forward fuselage areas is generally less damaging to controls, since more avionics equipment resides in this area typically, and damage is easier to detect by the crew located nearby. With these areas in mind, image scanning must be directed to these areas specifically.

To monitor the aft stabilizer areas 18, 20 it is preferred that at least two optical imaging devices 24 be positioned on the wings 16, one on each side of the fuselage, to have a FOV slightly larger than the aft section 22. The preferred location of the imaging means 24, especially where they comprise high resolution cameras, is adjacent the outer wing ends 26. This is true for smaller aircraft. On large aircraft such as illustrated in FIG. 2, there are often intermediate wing regions that can be used.

The aircraft 10 of FIG. 1 illustrates the use of cameras 24 mounted within the volume of the wing ends 26. The use of these regions is preferred because it primarily comprises non-structural volume which acts as a rounded or tapered, low drag and turbulence, termination of the wings 16. These regions are generally devoid of other structures as well as hydraulic or fuel lines. Therefore, cameras or associated electronics can be positioned within this volume without impacting on other apparatus in any significant manner.

For purposes of illustration the preferred embodiment is now described using high resolution cameras for imaging means 24, although alternatives are discussed below later.

The use of outer wing structure 26 also allows the retro-fitting of the present invention to most conventional aircraft.

Currently, this region is sometimes occupied by special lights for illuminating or displaying air carrier "logos" or names on the aft section in flight or taxi areas at airports. However, for the present invention the camera is mounted within this volume so that it has a substantially unobstructed view of the aft region 22 of the aircraft and yet does not protrude above the surface of the wing 16.

One purpose of this invention is to provide the benefits of in flight damage assessment to existing aircraft which requires that the cameras 24 interface with the structure or exterior airfoil of the aircraft 10 so that flight characteristics are not significantly altered. This means that the cameras 24 would be mounted within the outer wing structure 26 and use an opening in the surface for the FOV observation. In new aircraft, more leeway in design and location is allowed since the structure of the wings can be made to accommodate cameras in advance. This would include alteration of fuel storage regions in wings 16 to provide a "pocket" in which cameras could be secured so as to have an adequate aft section FOV.

The imaging means 24 require an optically clear FOV of the tail or aft section 22. To accomplish this the camera is equipped with a cover plate that bridges the opening through which the camera looks. This cover plate can be made of a strong material such as plate glass or acrylic plastic. This cover plate provides protection for any camera lens as well as structural support across the opening for the wing "skin". This allows proper distribution of stress across the wing surface. The plate is secured to the wing using known aviation construction techniques.

It is also possible to provide an enclosure for the camera which has structurally enforced walls that attach to the interior structure of the wing tip 26. This would distribute the load around or across the opening required for the camera. In this case, a thinner essentially nonstress bearing, substantially transparent, view plate can be used to cover the opening.

Each wing 16 then has a camera 24 adjusted to focus on the aft section 22 of the aircraft 10. Since this invention can be used on a variety of aircraft 10 the focal length and pattern of the camera is adjusted according to the known dimensions of the individual aircraft. Aircraft designers and those skilled in aircraft maintenance readily appreciate the FOV requirements for each given camera system.

An additional camera 28 is positioned in the leading edge of the aft vertical stabilizer 18, commonly referred to as the tail. The leading edge of the vertical stabilizer 18 on most aircraft is a rounded or elliptically shaped region which covers or is in front of the main structural support extending up the tail from the main body. However, this volume is generally void of any hydraulic or control lines and represents another zone in which material can be mounted without impinging upon other existing parts or structure. One concern with this zone is the presence of de-icing equipment. On newer jet aircraft this region is generally maintained at a warm or elevated temperature in order to prevent ice from sticking to the surface. This warming can be accomplished by resistive electrical strips or surface heaters. A more common method is to run warm air inside the leading edge volume of the tail. Generally this will not affect the operation of any camera equipment 28, however, the camera 28 must not obstruct the flow of air.

The camera 28 is secured to the aft vertical stabilizer 18 as high above the main fuselage as practical for both the volume available and the structural support alteration required to support the camera. There are general Federal Aviation Agency regulations governing the alteration of aircraft structure for each type of aircraft. These regulations are contemplated as within the skill of design engineers and aircraft mechanics who would install the present invention. These regulations place general limits on where the camera could be positioned.

The camera 28 is adjusted to have a wide FOV looking forward over the fuselage but slightly downward to view the wing 16 surfaces. It is possible to install camera 28 or several cameras 28 in the horizontal stabilizers 20 of many large aircraft, but it is the desire to have as much of an unobstructed view of the leading edge 12 of the wings 16 that makes the use of the vertical stabilizer position preferred.

An additional set of cameras 30 is secured under the aircraft to observe the underside or the landing gear. A common mishap in aircraft has been the failure of landing gear indicators without the landing gear failure. This causes costly preparations for crash landings that are unnecessary.

The underside cameras are not subject to the same constraints as the wing 16 and stabilizer 18 cameras. The airflow under the aircraft can generally be disturbed by various pods or projections without serious detriment. Therefore, the cameras 30, only one illustrated for clarity, can be mounted within small projecting pods 32 positioned adjacent the wing 16 and main fuselage intersection. The cameras 30 are positioned with one on each side of the body and one having a substantially forward FOV and the other a rear FOV.

Even though this mounting is possible, it may be preferred to mount one camera 30 to the forward landing gear bay doors so that it only extends under the aircraft when the gear is down. This saves on surface drag and provides the required check of the landing gear system.

For those applications in which the imaging means comprise high resolution cameras, video cabling will be installed to connect the cameras to a central interface apparatus. Generally there are access ports installed on the underside surface of most aircraft wings for servicing fuel and hydraulic lines, etc. These access points can be used to feed the required video quality cabling and any associated electrical supply lines through the wing structure to the wing 16 and main aircraft body interface.

Alternatively, fiber optic cables can be employed with electro-optical adapters known in the art, to convert electrical output of cameras to a light signal which is transmitted through the fiber optic cable. This has several advantages in that high quality low loss fiber optic waveguides exist which are highly resistant to damage by abrasion, liquid exposure, or high heat. This combined with a high intrinsic strength makes such fiber cables well suited for continued operation in the harsh environment often created by severe aircraft damage. Also since such fibers are extremely small, on the order of a few hundred microns in diameter, they can even be surface mounted on the wing without substantial impact on the airfoil characteristics.

An alternative to the use of a camera as imaging means 24 on the wing 16, would be the use of a fiber optic bundle terminated in a fiber optic face plate. The fiber optic face plate would have a lens positioned adjacent to it in a manner known in the art of optical waveguides so as to focus light from within the desired aft FOV into the optical fiber. This technique has advantages of decreased weight and the increased survivability. The volumetric requirements are less than that of a camera. In addition, the light can be transferred to a central camera or optics system for further image processing, such as infrared filtering or image enhancement.

The main purpose of this invention is aircraft safety which includes the function of in flight damage assessment. However, in flight safety can also be improved by using imaging means to cover non-aircraft FOV's.

The camera's 24 and 28 can have a wide lens configuration which is remotely selectable, whereby a wider FOV can be selected. In addition, a camera 34 can be mounted adjacent camera 30 or on top of the fuselage.

By employing a wide FOV on these camera's, aircraft crew can see a wider FOV and detect approaching aircraft that otherwise go undetected.

When these latter FOV's are being observed, the image data could be processed by a small on board computer system to detect a change in the overall content of the images which is indicative of the presence of aircraft.

Turning now to FIG. 3, a series of interior cameras 40 are also used with the system of the present invention in order to provide internal security surveillance. The exact position of each interior camera will vary according to the interior configuration chosen for a given aircraft by each air carrier. However, the general guidelines which are readily understood by those skilled in the art are: that each "passenger class" section 42 should be in the FOV for at least one camera. More importantly, an imaging means should be positioned to observe the passenger entry doors and the main cargo bay. These latter positions are important because it is here that single, one person at a time, observations can be made. This observation is useful for detecting known "risk" persons before the aircraft leaves the ground.

In positioning the cameras 40, it should be kept in mind that a non-conspicuous mounting is the preferred approach. More security is gathered often from observation of activities accomplished in "presumed" secrecy. Therefore, locations such as in flight movie projector cases and "galley" storage panels serve best to contain these cameras.

These internal cameras allow increased security by observing personnel or passengers in higher intensity, controlled light conditions which presents a better image as opposed to crowded, low intensity terminal areas often found in major overseas airports.

The camera system can also be left activated when the aircraft is sitting in maintenance areas or awaiting baggage or cargo so that the specific personnel and activities carried on near the aircraft or in cargo or passenger seating areas can be continuously observed from a remote site or recorded for later review.

Turning now to FIG. 4, a damage and surveillance system constructed according to the present invention is illustrated in schematic form to better show the remaining elements employed.

Image means 24, 28, 30 and 40 are all connected by either video or fiber optic cables 50 through predetermined paths in the structure of aircraft 10 to a central interface means and controller 60.

Controller 60 accepts each imaging means input as a separate channel and may include known electronic or electro-optic devices to amplify the signals. These incoming signals are transferred to a recording means 70 where all of the images or image data is recorded.

Recording means 70 comprises a multi-channel apparatus for placing the incoming channels of video or image data onto a magnetic media. The recording mechanism would comprise substantially known electronics and hardware elements already used for recording flight instrumentation data. The recording means 70 is constructed in a manner similar to apparatus used for current "black box" recorders. These boxes are constructed to withstand impact forces on the order of 1000 g and dead weight on order of 5000 lbs or more. The casing of current recorder mechanisms for use in aircraft are constructed to withstand temperatures on the order of 1,100 degrees Centigrade. In addition, current magnetic recorders are manufactured to withstand long term exposure to salt water, hydraulic fluids, and fuel. Therefore, recorder means 70 must be manufactured to the same requirements as used by those skilled in the art to construct present recorder apparatus. The difference in the existing recorders and the present recorder 70 is that the recording electronics must provide a sufficiently wide response bandwidth to record video frequency signals. It is also preferable that the recorder 70 allow for additional channels of information such as a single channel that records which channels of information the crew are observing at any time and a channel for image data transmitted to the aircraft.

The recorder means 70 is required to have sufficient medium available to have at least $\frac{1}{2}$ hour recorded at all times. A magnetic tape medium can provide even longer recording periods, and it is preferred that 24 hours of image data be stored.

At substantially the same time that the image data information or signals are transferred to the recorder means 70, they are fed to telemetry transfer means 80 which transmits the image data to ground stations 82 for analysis and data base storage. This can occur in flight or while the aircraft is parked on the ground.

The ground receptors 82 direct the signal to apparatus for decoding, recording or further transmitting the optical images through ground based means. This latter approach allows the use of the imaging information to continuously compare with and update data base information for security reasons or store larger amounts of aircraft damage assessment data for quick access. The telemetry transfer means 80 uses a small external antenna common on many aircraft for communications. It may also be possible to utilize what is known as a phased array type of element now used in radar systems. This also allows surface mounting without air flow perturbation and could be used both as under carriage 86 and on top 88 mounting antennas for satellite communication, as illustrated in FIG. 1.

A display means 90 such as a small video monitor is positioned within the crew flight deck/cabin area so as to be viewable by the pilots of the aircraft. While the preferred embodiment contemplates the use of a high resolution video monitor such as those employed for radar displays in some aircraft, it is also possible to employ some type of head up display. In a head up display mode the image would be projected to a reflective element in front of the pilots. This mode is not as useful since the quality may be poor and it would hamper forward viewing.

Associated with the display means 90 is a camera selector 92 which operates in conjunction with controller 60 to select the particular image information to be viewed. The ability to select between channels of video or image data and selectively transfer one or more to a display screen is known in the art of television and communications.

The camera selector 92 must be able to select either a single channel of image data or several channels at a time so that the pilot can quickly scan one or more areas of concern and know immediately the true nature of a problem. For convenience, camera selector 92 can incorporate electronic elements such as a small microprocessor having predetermined instruction sets to scan the separate channels of image data from the cameras in a variety of selectable sequences.

What has been described then is a method and system for providing in flight damage assessment capability by viewing exterior portions of an aircraft and providing images of these views for cockpit display available to the crew. This system also provides video recording of the information to a crash survivable video recording means which contains at least the last ½ hour of the flight at any time. Additional optical scans of the interior portions of the aircraft are similarly recorded and all of the information transferred to ground stations for review and data base update.

It should be noted that for applications using high resolution cameras, image intensifiers, as known in the art, can be used for night vision purposes, although lights present on many aircraft may negate the need for this. Infrared cameras can be used along side "regular" cameras to achieve night vision as well.

In the case of image intensifiers or infrared camera's, camera controller 92 should have an engagement switch to control the activation of these devices. However, the controller 60 can contain an optical intensity detector, as known in the optical arts, which could automatically activate alternate devices in the presence of low light intensity.

Also, since the aircraft can, now view visual image type data, this type of data can be transmitted to the aircraft for viewing. In this manner, actual visual information about local airport conditions might be transferred to the pilots.

Pilots and aircraft engineers have long been required to rely on the subjective statements of ground personnel as to flight conditions. By providing a series of camera's along standard flight paths, such as on ILS towers near runways, objective image data can be obtained. These more objective images can be transmitted to the aircraft at some distance away, say on the order of 5 to 20 miles. This provides the pilot with superior insight into what conditions are really like. Therefore, the telemetry transmitter 80 also acts as a telemetry receiver to obtain the transmitted images for routing to the controller 60 and to the display 90. It is also preferred that at least one channel in the recorder 70 be used to record this image data for analysis in case of an aircraft crash.

What I claim is:

1. An in flight damage assessment and security system for aircraft comprising:
imaging means for capturing optical images of predetermined portions of said aircraft substantially continuously during flight, being disposed along the exterior of said aircraft such that the flight characteristics of the aircraft remain substantially unaltered, said imaging means comprising:
a plurality of video cameras positioned on the structure of said aircraft and positioned to view a first and a second side of a vertical stabilizer, an upper side of a fuselage and two aircraft wings, a front landing gear under carriage portion and an aft underbody portion of said aircraft, including an underside of said wings;
means for recording images captured by said imaging means on a storage media, said recording having an enclosure which provides for the survival of said storage media even when subjected to the harsh environment of an aircraft crash;
display means for displaying said captured optical images to aircraft crew members; and
means for interfacing said imaging means to said recording means and said display means.

2. The damage assessment system of claim 1 further comprising telemetry transfer means for transmitting said captured optical images to one or more remote receiving stations.

3. The damage assessment system of claim 2 wherein said telemetry transfer means further comprises means to transfer optical images from one or more ground stations to said interfacing means.

4. An in flight damage assessment system for aircraft comprising:
imaging means for capturing optical images of predetermined portions of said aircraft substantially continuously during flight, being disposed along the exterior of said aircraft such that the flight characteristics of the aircraft remain substantially unaltered, said imaging means comprising:
a first video camera mounted within an outer portion of a first wing structure so as to focus on a first side of an aft tail section from a first wing;
a second video camera mounted within an outer portion of a second wing structure so as to focus on a second side of said aft tail section from a second wing;
first and second optical windows positioned adjacent said first and second video cameras so as to preserve the airfoil shape of said first and second wings comprising substantially optically transparent material;
means for recording images captured by said imaging means on a storage media, said recording having an enclosure which provides for the survival of said storage media even when subjected to the harsh environment of an aircraft crash;
display means for displaying said captured optical images to aircraft crew members; and
means for interfacing said imaging means to said recording means and said display means.

5. The system of claim 4 further comprising;
a third video camera mounted within a leading edge of a vertical stabilizer so as to focus on a predetermined portion of said first and second wings including a trailing edge and a portion of a leading edge for each of said wings.

6. The system of claim 1 further comprising:
second imaging means for capturing optical images of predetermined portions of said aircraft being disposed within the interior of said aircraft so as to be substantially unseen by aircraft passengers; and
telemetry transfer means for transmitting said captured optical images to one or more receiving stations remote from said aircraft.

7. The system of claim 6 wherein said optical images captured by said second imaging means comprises
a view of each predetermined passenger class section of which said aircraft interior is divided into; each point of ingress or egress used for passenger entry or exit; and interior pathway used for cargo loading and any restroom areas located within said interior.

8. A method of providing in flight damage assessment for an aircraft while in atmospheric flight comprising the steps of:

disposing imaging means for capturing optical images of predetermined portions of said aircraft along the exterior of said aircraft such that the atmospheric flight characteristics of the aircraft remain substantially unaltered;

capturing optical images of predetermined portions comprising first and second sides of vertical stabilizers, upper fuselage and wing surface, front landing gear under carriage and aft underbody including underside wing surfaces;

providing recording means for recording optical data on a storage media, said recording means having an enclosure capable of protecting said media even when subjected to the harsh environment of an aircraft crash;

securing said storage means within said aircraft; providing display means for visually displaying at least one image of said captured optical images to aircraft crew members; and interfacing said imaging means to said recording means and said display means.

9. The method of claim 8 further comprising the steps of:

capturing a first set of optical images of predetermined portions of an exterior of said aircraft using first imaging means disposed on said aircraft;

capturing a second set of optical images of predetermined portions of an interior of said aircraft using second imaging means disposed on said aircraft; and transferring said first or second set of images to at least one image receiver located external to said aircraft through a telemetry transceiver.

10. The method of claim 8 further comprising transferring said captured optical images to at least one remote receiver located external to said aircraft.

11. The method of claim 8 further comprising the steps of capturing a third set of optical images of predetermined portions of aircraft landing areas and approaches thereto taken from a plurality of remotely, land based cameras;

transferring said third set of images to said display means through a telemetry transceiver for viewing while said aircraft is still in flight.

* * * * *